United States Patent [19]

Cone et al.

[11] 3,813,533

[45] May 28, 1974

[54] CLOCK CALCULATOR

[75] Inventors: George W. Cone, La Jolla; James E. Kinzie, Oceanside, both of Calif.

[73] Assignee: Garrett Comtronics Corporation, San Diego, Calif.

[22] Filed: June 2, 1972

[21] Appl. No.: 259,060

[52] U.S. Cl. ................ 235/156, 58/50 R, 58/152 R

[51] Int. Cl. ......................... G04c 23/00, G06f 7/38

[58] Field of Search ........... 235/156, 152; 58/152 R, 58/50 R

[56] References Cited

UNITED STATES PATENTS

| | | | |
|---|---|---|---|
| 3,546,696 | 12/1970 | Waters et al. | 235/152 X |
| 3,610,902 | 10/1971 | Rahenkamp | 235/152 |
| 3,646,751 | 3/1972 | Purland | 58/50 R X |
| 3,653,204 | 4/1972 | Miwa | 58/42.5 |
| 3,664,116 | 5/1972 | Emerson et al. | 58/50 R |

*Primary Examiner*—Felix D. Gruber
*Assistant Examiner*—David H. Malzahn
*Attorney, Agent, or Firm*—Albert J. Miller; Robert S. Swecker; Frederick G. Michaud, Jr.

[57] ABSTRACT

A combined clock calculator having a calculator mode to perform and/or display arithmetic functions and results and a digital clock mode to perform and/or display time related functions.

48 Claims, 9 Drawing Figures

CLOCK CALCULATOR

BACKGROUND OF THE INVENTION

Electronic calculators of varied construction and performance capabilities have been available for some time. Four function (addition, subtraction, multiplication, and division) calculators with advanced MOS (metal oxide semiconductor) and/or LSI (large scale integration) chips have recently become commonplace. Multi-digit numerical displays visually present the calculator information.

At the same time, digital clocks, characterized in that the time is displayed in a digital readout form as opposed to the movement of hands on a clock face, have gained widespread acceptance in the marketplace. Both rotating drum and indicator tubes have been utilized as displays.

Clocks generally and in some cases digital clocks have sometimes incorporated diverse functional elements or have been combined with other electrical or electronic appliances. The most common example of this is probably the clock radio. Other known combinations include the clock calendar, clock timed switches, telephone clocks, clock amusement devices, recorder clocks, counter-timers, and other related combinations. In many of these combinations, little in the way of integration of the elements combined has been proposed and in most cases is just not feasible or practical in view of the diversity of the elements to be combined. U.S. Pat. Nos. examplary of such combinations are 3,653,204, 3,608,301, 3,512,355, 3,433,405, 3,357,703, and 3,333,410.

SUMMARY OF THE INVENTION

The present invention represents a fully integrated clock calculator capable of independent operation either as an electronic calculator or a digital clock. The clock calculator shares the same cabinet, power supply, keyboard, and display. The calculator circuitry and clock circuitry may be incorporated in separate solid state chips or combined into one chip. The clock mode of the clock calculator may incorporate varied time related functions such as a calendar, audible or visual alarm, interval timer, timed switch, and/or power failure indicator.

DESCRIPTION OF THE PREFERRED EMBODIMENTS

Figure 1:
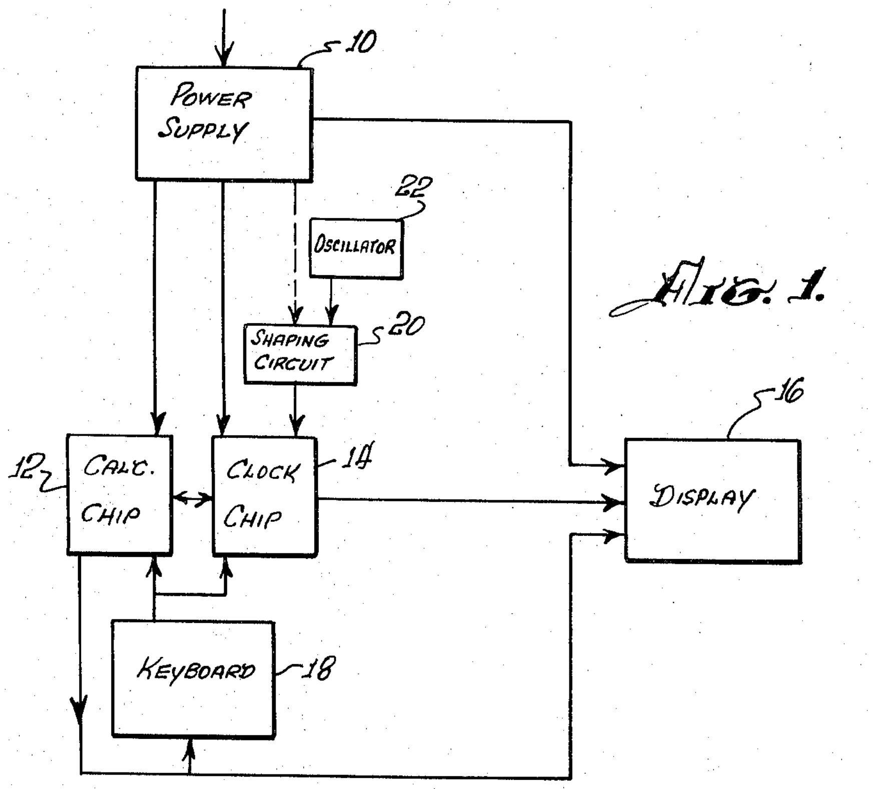
FIG. 1 is a schematic block diagram of the clock calculator of the present invention.

The clock calculator of the present invention is schematically illustrated in block form in FIG. 1. The power supply 10 which receives electrical energy from a power source such as an electrical battery or an AC line, is used to convert and regulate the electrical energy. For a 4 to 6 volt battery power source, the power supply 10 would convert the voltage upward to a preselected level and regulate the voltage to maintain it at this preselected value. With a 110 volt AC power source, the power supply 10 must first rectify the current from AC to DC and filter the current to reduce ripple before converting and regulating the voltage.

The converted and regulated voltage from the power supply 10 is provided to the calculator chip 12, the clock chip 14 and the digital display 16. The entire calculator chip 12, which includes circuitry for performing the calculator functions is permeated by voltage from the power supply 10. By way of example, the calculator chip may be any solid state integrated circuit device such as a four function (addition, subtraction, multiplication and division); 8 digit, floating point in, floating point out, single MOS/LSI chip.

The calculator chip 12 receives numerical values in the form of electrical signals from the keyboard 18. In addition to these numerical values, arithmetical commands to perform operations on these numerical values are provided together with instructions to clear numerical values and operation commands from the chip and also to clear the display. The calculator chip 12 provides the results of these operations in numerical values to the display 16.

The clock chip 14 includes integrated clock circuitry which is also permeated by voltage from the power supply 10. In addition, the clock chip 14 receives a time dependent AC signal of known frequency of a rate equal to or higher than 50 hertz from the power supply 10 or alternately from a stable oscillator 22. This AC signal is provided through a shaping circuit 20 which conditions the signal to eliminate noise. The values of time are provided to the clock chip 14 from the keyboard 18 through the calculator chip 12. In addition, the calculator chip 12 supplies timing synchronization signals to make the serial transfer of information to the clock chip 14 possible.

The keyboard 18 instructs the clock chip 14 on what values of time are to be displayed in the display 16 in addition to providing other miscellaneous instructions thereto. Further, the clock chip 14 directs the calculator chip 12 off of the display 16 when time values are to be displayed thereon. The keyboard 18, in addition to providing information and directions to the calculator chip 12 and clock chip 14, receives timing signals from the calculator chip 12 which permits time division multiplexing (TDM) to be employed so as to reduce the number of connecting lines between the keyboard 18 and the chips 12 and 14. The display 16 can be any multi-digit numerical display such as glow discharge indicator tubes or an electro-fluorescent type.

Figure 2:
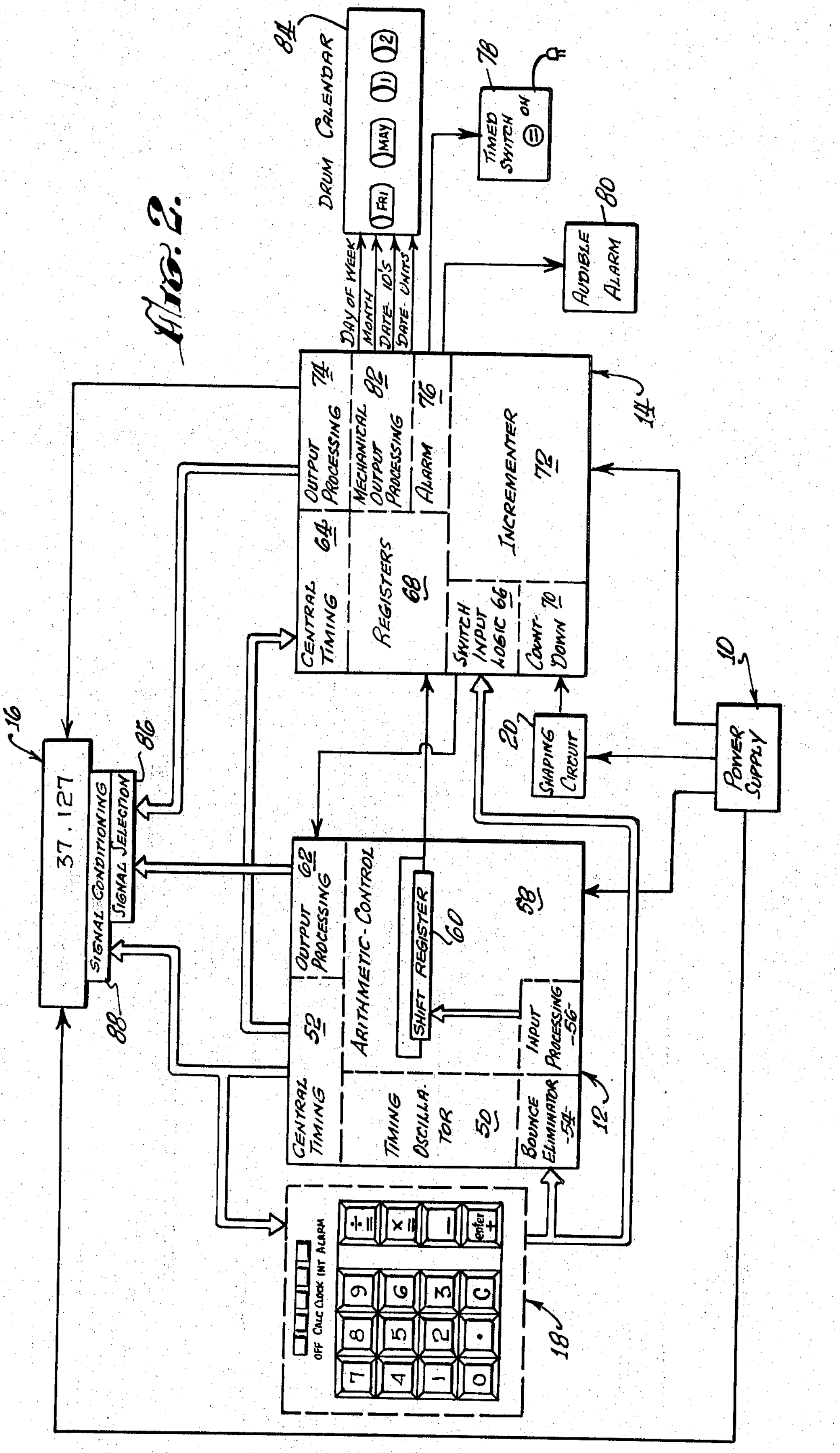
FIG. 2 is an expanded schematic block diagram of the clock calculator of FIG. 1.

An expanded, more detailed, schematic of the clock calculator is illustrated in FIG. 2. As before, the power supply 10 provides a converted and regulated voltage to the calculator chip 12, clock chip 14 and display 16. The keyboard 18 is shown by way of example as a 16-key board having the numerals from zero to 9, a decimal key and a "C" or clear key in one grouping plus four operational keys in another grouping. This keyboard provides for the entry of various numerical values and arithmetic commands to the calculator chip 12. In addition, the keyboard includes an "OFF" button to turn the display off, a calculator or "CALC" button to be pressed when the clock calculator is to be used as a calculator, and a "CLOCK" button to be pressed when the clock calculator is to be used in the clock mode. In addition, an interval or "INT" button and an "ALARM" button are also provided for utilization in the clock mode. Both the clock and calculator modes of operation are programmed from the same keyboard.

The calculator chip 12, such as a large scale integrated insulated gate field effect device, has been functionally divided into a series of sections to facilitate an understanding thereof and its relationship with the clock chip 14. The calculator chip 12 includes a timing oscillator 50 which provides two phase signals from which all synchronous logic operates and from which more complex timing signals are formed. A basis frequency such as 50 KHz is acceptable. The central timing section 52 generates the next higher degree of timing signals for both the calculator chip 12 and clock chip 14. These signals are used throughout all of the other functional sections and are also used by the display 16. The signals for synchronizing the two chips 12 and 14 are generated here as are the signals used for interpreting the keyboard inputs. The bounce eliminator 54 removes any noise created by the opening and closing of the keyboard switch contacts to provide irredundant data to the remainder of the system.

Input pulses from the keyboard 18 are interpreted in the input processing section 56 to be numerical, functional, etc. information. Numerical data is changed from a timed signal to a Binary Coded Decimal format. The data entered from the keyboard 18 is processed as directed in the arithmetic and control section 58 which includes a plurality of shift registers 60. When an operation has been completed the result is stored in this section for further use. The output processing section 62 continuously applies the results of calculations or keyboard numerical inputs to the display 16 in a time phased manner to generate what appears to be a steady visual output.

The clock chip 14 includes a central timing section 64 which derives logic timing signals peculiar to the clock synchronized by timing signals received from the central timing section 52 of the calculator chip 12. The switch input logic section 66 receives, processes and stores inputs from the keyboard 18 which are used exclusively by the clock chip 14. The register section 68 of the clock chip 14 includes a plurality of recirculating shift registers which store values of time formulated in binary coded decimal format. By way of example, there may be six registers including one each for time of day, alarm, timed switch on, timed switch off, date, and interval timer. Numerical values keyed into the calculator shift registers 60 are transferred to the appropriate register in the clock register section 68 as directed by the clock switch input logic 66.

A power line signal, for example either 50 or 60 Hz, is counted down in the count down section 70 to produce a single pulse each second which is used to trigger an add cycle in the incrementer section 72. The power line signal is received from the power supply 10 through the shaping circuit 20. The incrementor 72 detects from the count down section 70 the passage of each second and adds 1 second to the time of day register thereby accumulating the 1 second time increments. In a similar way, 1 second is either added to or subtracted from the interval timer, since the interval timer is capable of counting down time as well as up time. Also, when midnight is detected the value of the date register is incremented. As illustrated in the table below, the incrementer 72 is capable of incrementing in a number of moduli.

| | |
|---|---|
| sec. | 0 mod 60 |
| min. | 0 mod 60 |
| hr. | 1 mod 12 |
| day | 1 mod 28 |
| or | 1 mod 29 |
| or | 1 mod 30 |
| or | 1 mod 31 |
| month | 1 mod 12 |

The output processing section 74 continuously applies one value of time as requested by the user to the display 16 in a time phased manner to generate what appears to be a steady visual output. Under control of the operator, a time value may be displayed instead of a calculator value. The calculator display can be disabled by instruction from the clock switch input logic 66 to the calculator output processing section 62. The alarm logic 76 checks for coincidence with real time and the alarm, timed switch on and timed switch off registers. An output is produced when compensation is received to control a timed switch 78 and/or an audible alarm 80. The alarm 76, incrementer 72, and output processing 74 all receive values from the register section 68 and these values can be retrieved by the registers from these various sections.

A mechanical output processing section 82 may also be provided in the clock chip 14 to produce long term duration (one second) pulses to drive a mechanical device such as a drum calendar 84 consisting of drum displays for the day of the week, the month, the date 10's digit and the date unit's digit. Appropriate compensation is made for added or deleted pulses at the month end. However, an external switch input would be required for a leap year compensation.

The display 16 includes a signal selection section 86 which receives signals from the calculator output processing section 62 and the clock output processing section 74. The output of the signal section 86 is provided to the signal conditioning section 88 which also receives timing signals from the calculator central timing section 52. A numerical calculator mode display is illustrated by way of example.

Figure 3:
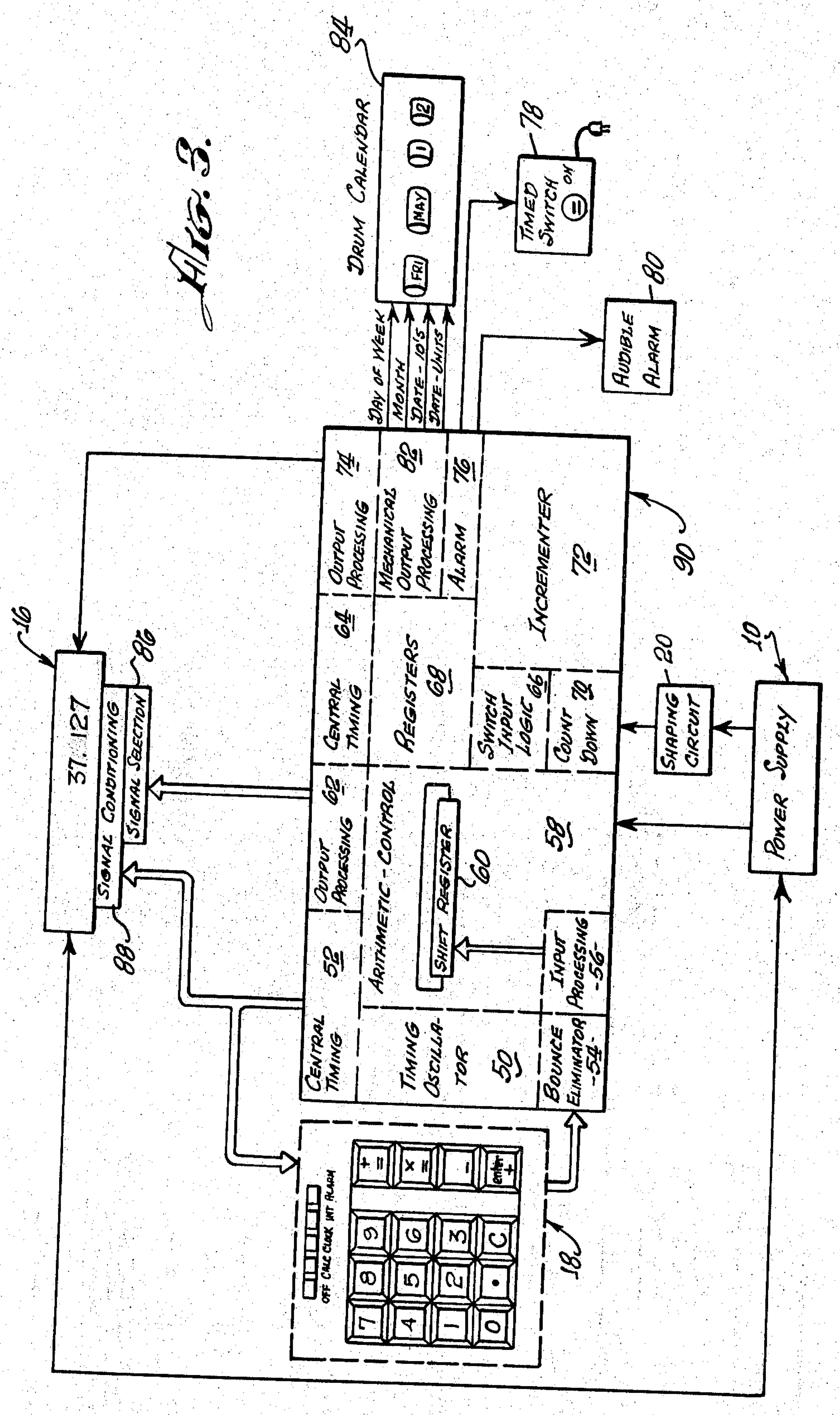
FIG. 3 is an alternate embodiment of the clock calculator of FIG. 2.

While the clock chip 12 and calculator chip 14 have been illustrated as separate chips in FIG. 2, it is possible that the functions of these two chips can be combined into a single chip 90 as illustrated in FIG. 3. The elements and functions remain substantially as described with respect to FIG. 2 except that the connections have been somewhat simplified.

A minimum of lines are required to connect the various components of the clock calculator. The 16 keyboard switches, as illustrated in FIG. 2, are time multiplexed which simplifies both the interconnection and the internal logic. The complete 8 segment encoding takes place within the calculator chip 12. Since only one display digit is selected at a given time, power requirements are reduced, hook-up is simplified and crossed circuitry is eliminated.

The method of performing calculations using the calculator chip is consistent and simple. First the number is entered in the keyboard; second, the key indicating the operation the number is to perform is pressed and in less than two-tenths of a second the result is displayed. The decimal point is automatically positioned so that the maximum amount of information is always retained. Should an intermediate problem solution temporarily exceed the eight displayable decimal locations, the point position will be remembered and subsequently displayed when a later calculation returns the point within range.

If in the middle of a sequence of calculations a wrong number is inadvertently entered, a single operation of the clear button will clear the erroneous entry and display the previous result. A second operation of the clear button will clear the arithmetic center of the machine and also the display. A special "zero remainder" can be incorporated into the calculator chip to cause division to cease when all additional quotient digits will be zero. This results in a clear display presentation and a definite indication that a zero remainder has been obtained. Because each individual operation consists of a data entry followed by a function key to operate on the previous result, chain operations are no more than a sequence of data entry/function pairs.

Figure 4:
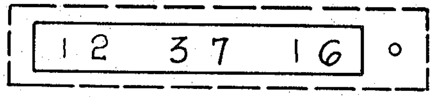
FIG. 4 is a representation of the time of day display.

In addition to the calculation results which can be displayed on the display 16, the display can also display time values. Examples of clock mode displays are provided in FIGS. 4–9. When the clock mode of operation is selected, the time of day is displayed as shown in FIG. 4 in hours, minutes and seconds on a modulo 12-hour basis. In addition an AM or PM indicator can also be displayed. In FIG. 4, the time is shown as 37 minutes and 16 seconds after 12 o'clock. This value of time, continuously updated by the accumulation of time increments as was previously described, would be displayed whenever the clock button is depressed and no other time related function is being utilized.

Accumulation of the correct time is not affected by entry to or exit from the clock mode or by calculator mode operation. The setting of time can be accomplished by clearing the calculator accumulator, keying in the time of day to the nearest second and pressing the "1" key when either + (for AM) or − (for PM) is simultaneously held depressed.

Figure 5:
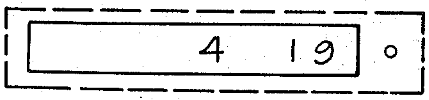
FIG. 5 is a representation of the calendar display.

A calendar date, as shown in FIG. 5, may also be displayed in the clock mode. Setting of the calendar is by manual means accomplished in the clock mode by clearing the calculator accumulator, keying in the date, and pressing the "2" key when the + key is simultaneously held depressed. The format for entering the day is one or two digits representing the month (1–12) followed by two digits indicating the day. For example, Jan. 23 is displayed as 1 23, while Dec. 3 is displayed as 12 03. The date may be displayed at any time in the clock mode by holding the "2" key depressed. When the "2" key is released, the time of day will return to the display.

An audible alarm can be activated when coincidence between the time of day and an alarm setting is achieved. The alarm button must be depressed to utilize the alarm. If on, the alarm will continue until the alarm button is turned off or until the clear key is depressed. A volume control can be provided. Until externally altered, the alarm setting will remain intact and will be capable of activating the alarm at the same time every 24 hours.

Figure 6:
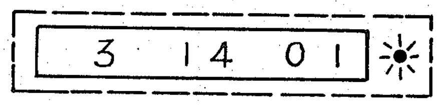
FIG. 6 is a representation of the alarm setting display.
Figure 7:
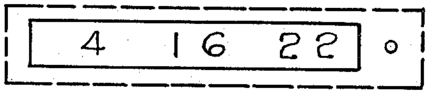
FIG. 7 is a representation of the timed switch on setting display.
Figure 8:
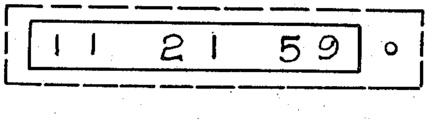
FIG. 8 is a representation of the timed switch off setting display.

Setting of the alarm is accomplished in the clock mode by clearing the calculator accumulator, keying in the alarm value to the nearest second, and pressing the "3" key when either + (for AM) or − (for PM) is simultaneously held depressed. The alarm setting is displayed in the clock mode, as shown in FIG. 6, as long as the "3" key is held depressed. When the "3" key is released, the display will revert to the time of day.

Figure 9:
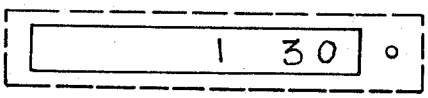
FIG. 9 is a representation of the interval timer setting display.

An interval timer measuring elapsed time to the nearest second beginning either at zero, or at a preset value, is also incorporated in the clock mode. If a starting value is preset, as shown in FIG. 9, the value is counted down until zero is reached, at which time the minus sign is turned on and an upward count begun. If the alarm button is on, the alarm will be turned on at zero.

The interval timer may be preset only when the "INT" button is depressed. Once started, however, it is unrelated to the mode switch setting and will continue to run, and may activate the alarm in any of the other operating modes. The value of the interval timer likewise may only be displayed in the "INT" mode and may be stopped only in the "INT" mode by depressing the "X" switch. Pressing the clear button in the "INT" mode will restart the timer from its previous setting. While striking the clear key twice and then pressing enter will cause the timer to begin counting from zero. Likewise striking the clear key twice, keying in the time value to the nearest second and pressing enter will preset into the counter a value to be counted down. Presetting and clearing of the interval timer can take place only in the "INT" mode. If the timer is in a hold condition due to a previous striking of the "X" key, this condition will be canceled by an entry of zero or a preset value.

The clock mode may also include a timed switch providing a turn-on time (FIG. 7) and a turn-off time (FIG. 8) for an electrical outlet switch. Activation of the outlet takes place when the time of day corresponds to the time set into the on-time register. The outlet remains energized until the time contained in the off-time register is reached at which time the outlet is disconnected. While operation of the switch is independent of the mode setting, the setting or viewing of the on-and off-time registers may take place only in the clock mode.

Data is entered in the customary manner by pressing the clear key twice and keying in the time to the nearest second. The register contents are displayed in the clock mode as long as the "4" key for turn-on time or "5" key for turn-off time are depressed.

An output logic signal may be tied in parallel with the negative sign indicator to provide a blinking signal to alert the user that a power interruption has occurred and that erroneous values may exist in the various time registers. This logic operates in conjunction with an input signal which must flag the power supply voltage in returning to its normal level upon power restoration.

While specific embodiments of the invention have been illustrated and described, it is to be understood that these embodiments are provided by way of example only and that the invention is not to be construed as being limited thereto, but only by the proper scope of the following claims.

What I claim is:

1. A clock calculator comprising:
a solid state calculating circuitry chip for performing arithmetic calculations in response to digital input data and for generating digital information related to said calculations;
a solid state clock circuitry chip for performing time-related clock functions with reference to digital input data including the continuous accumulation of time increments to provide an indication of time of day and for generating digital information related to said time-related clock functions;
a manual keyboard for manually providing digital input data;
circuit means for supplying said digital input data from said manual keyboard to said calculating circuitry chip and said clock circuitry chip;
an electronic digital display connected to said calculating circuitry chip and said clock circuitry chip to display said digital information therefrom; and,
a power supply connected to said calculating circuitry chip, said clock circuitry chip and said display to supply electrical power thereto;
said keyboard including means to select between a calculator mode of operation and a clock mode of operation, said selecting means being operable to effect the display by said digital display of said digital information from said calculating circuitry chip in said calculator mode and to effect the display by said digital display of said digital information from said clock circuitry chip in said clock mode, said manual keyboard and said digital display being common for said calculating and clock circuitry chips.

2. In combination:
a power supply for providing regulated electrical energy;
at least one solid state, integrated circuit chip connected to said power supply to receive said regulated electrical energy therefrom, said at least one chip including electronic calculator circuit means for digitally performing arithmetic calculations and electronic clock circuit means for digitally performing time-related clock functions including the continuous accumulation of time increments to provide a continuously updated time of day;
manual keyboard means connected to said at least one chip for selectively supplying digital data signals representative of numerical and time values to said calculator and clock circuit means on said at least one chip; and,
digital display means connected to said power supply and said at least one chip for visually displaying a selected one of the results of the arithmetic calculations of said calculator circuit means and the results of the time-related clock functions of said clock circuit means.

3. The combination of claim 2 wherein said at least one chip includes:
output processing means for substantially continuously receiving output signals from said calculator circuit means and said clock circuit means including the results of the arithmetic calculations and the results of the time-related clock functions and for periodically applying said results to said digital display means at a repetition rate to provide the appearance of a steady visual display.

4. The combination of claim 2 wherein said at least one chip includes:
circuit means for generating timing signals and supplying said timing signals to said calculator circuit means, to said clock circuit means and to said manual keyboard means, said timing signals synchronously multiplexing the supplying of said digital data signals from said manual keyboard means to said clock and calculator circuit means.

5. The combination of claim 2 wherein both said calculator circuit means and said clock circuit means each comprise a MOS/LSI chip.

6. The combination of claim 2 wherein said calculating circuit means and said clock circuit means are integrated into a single MOS/LSI chip.

7. The combination of claim 2 wherein said digital display is a visible radiation display and includes a plurality of glow discharge indicator tubes.

8. The combination of claim 2 wherein said digital display is an electro-fluorescent display.

9. The combination of claim 2 and in addition shaping circuit means to receive a time dependent AC signal of at least 50 hertz from said power supply and to provide a conditioned timing signal to said clock circuit means.

10. The combination of claim 2 and in addition a stable oscillator to generate a time dependent AC signal of at least 50 hertz, and shaping circuit means connected to said oscillator to receive and condition the AC signal and provide the conditioned AC signal to said clock circuit means.

11. The combination of claim 2 wherein said clock circuit means includes alarm logic means to provide an alarm signal and in addition an alarm means to be activated by the alarm signal, said keyboard including means to select an alarm mode of said clock circuit means.

12. The combination of claim 11 and in addition to timed switch connected to said alarm logic means to receive and operate from a signal therefrom.

13. The combination of claim 2 wherein said clock circuit means includes a mechanical output processing section to provide a mechanical output signal representing a day and month and in addition mechanical means to receive and utilize the mechanical output signal to display said day and month.

14. The combination of claim 13 wherein said mechanical means is a drum calendar.

15. The combination of claim 2 wherein said manual input means includes numerical keys to provide numerical calculating and time values, operation keys to provide operation commands and switching keys to select the mode of operation.

16. Apparatus comprising:
a manual keyboard including means for manually selecting between a calculating mode and a clock mode of operation of said apparatus and means for selectively generating digital input data;
calculator means for digitally performing arithmetic calculations including addition, subtraction, multiplication and division;
clock means for digitally performing time-related clock functions including the continuous accumulation of time increments to provide an indication of time of day; and, circuit means for supplying said digital input data from said manual keyboard to said calculator means and said clock means;

said calculator means performing arithmetic calculations with said digital input data from said keyboard in response to the selection of said calculating mode of operation, and said clock means performing time-related functions with reference to said digital data from said keyboard in response to the selection of said clock mode of operation.

17. The apparatus of claim 16:

wherein said calculator means includes shift register means for temporarily storing said generated digital input data supplied to said calculator means from said manual keyboard; and, wherein said clock means includes storage register means connected to said shift register means for storing time-related digital data;

said stored digital input data being retained in said shift register means to perform arithmetic calculations in response to the selection of said calculating mode and being shifted into said storage register means to perform time-related functions in response to the selection of said clock mode.

18. The apparatus of claim 17 wherein said storage register means includes a calendar storage register for storing a first digital signal representing an updated day and month, said apparatus further including mechanical output processing means for providing a mechanical output drive signal in response to said first digital signal, and mechanical means connected to said mechanical output processing means for receiving said mechanical output drive signal and providing a display of said day and month.

19. The apparatus of claim 17 wherein said storage register means includes an interval storage register for storing a first digital signal representing elapsed time relative to a predetermined reference time, said keyboard including means for selecting an interval mode, said clock means including means for incrementing said first digital signal at predetermined time intervals in response to the selection of said interval mode.

20. The apparatus of claim 17 wherein said storage register means includes a time of day storage register for storing a first digital signal representing an updated time of day and an alarm storage register for storing a second digital signal representing a predetermined, fixed time of day, said keyboard including means for selecting an alarm mode, said clock means including means for comparing said first and second digital signals and means for providing an indication of coincidence between said first and second digital signals in response to the selection of said alarm mode.

21. The apparatus of claim 20 wherein said storage register means includes an interval storage register for storing a third digital signal representing elapsed time relative to a predetermined reference time, said keyboard including means for selecting an interval mode, said clock means including means for incrementing said third digital signal at predetermined time intervals in response to the selection of said interval mode.

22. The apparatus of claim 21 including:

digital display means for displaying numerical information; and, means for selecting one of said first, second and third digital signals and the results of the arithmetic calculations of said calculator means for display as numerical information by said digital display means in response to the selection of a corresponding one of said modes.

23. The apparatus of claim 21 wherein said storage register means includes a calendar storage register for storing a fourth digital signal representing an updated day and month, said apparatus further including mechanical output processing means for providing a mechanical output drive signal in response to said fourth digital signal, and mechanical means connected to said mechanical output processing means for receiving said mechanical output drive signal and providing a display of said day and month.

24. The apparatus of claim 23 including:

digital display means for displaying numerical information; and, means for selecting one of said first, second and third digital signals for display as numerical information by said digital display means in response to the selection of a corresponding one of said modes.

25. The apparatus of claim 16 including oscillator means for generating a timing signal, said oscillator means, said calculator means and said clock means being formed on at least one integrated circuit chip, said calculator and clock means being synchronously clocked in response to said timing signal.

26. The apparatus of claim 25:

wherein said calculator means includes shift register means for temporarily storing said digital input data supplied to said calculator means from said manual keyboard; and, wherein said clock means includes a storage register means connected to said shift register means for storing time-related digital data, said stored digital input data being retained in said shift register means to perform arithmetic calculations in response to the selection of said calculating mode and being shifted into said storage register means to perform time-related functions in response to the selection of said clock mode.

27. The apparatus of claim 26 wherein said storage register means includes an interval storage register for storing a third digital signal representing elapsed time relative to a predetermined reference time, said keyboard including means for selecting an interval mode, said clock means including means for incrementing said third digital signal at predetermined time intervals in response to the selection of said interval mode.

28. The apparatus of claim 26 wherein said storage register means includes a time of day storage register for storing a first digital signal representing an updated time of day and an alarm storage register for storing a second digital signal representing a predetermined, fixed time of day, said keyboard including means for selecting an alarm mode, said clock means including means for comparing said first and second digital signals and means for providing an indication of coincidence between said first and second digital signals in response to the selection of said alarm mode.

29. The apparatus of claim 28 including:

digital display means connected to said at least one integrated circuit chip for visually displaying numerical information; and, means for selecting one of said first and second digital signals for display as numerical information by said digital display means in response to the selection of a corresponding one of said modes.

30. The apparatus of claim 16 including:

display means for visually displaying numerical information; and, means for selectively supplying data from one of said calculator means and said clock means for visual display as numerical information in response to the selection of a corresponding one of said modes.

31. The apparatus of claim 30 including oscillator means for generating a timing signal, said oscillator means, said calculator means and said clock means being formed on at least one integrated circuit chip, said calculator and clock means being synchronously clocked in response to said timing signal.

32. The apparatus of claim 31:

wherein said calculator means includes shift register means for temporarily storing said digital input data supplied to said calculator means from said manual keyboard; and, wherein said clock means includes storage register means connected to said shift register means for storing time-related digital data, said stored digital input data being retained in said shift register means to perform arithmetic calculations in response to the selection of said calculating mode and being shifted into said storage register means to perform time-related functions in response to the selection of said clock mode.

33. The apparatus of claim 32 wherein said storage register means includes a time of day storage register for storing a first digital signal representing an updated time of day and an alarm storage register for storing a second digital signal representing a predetermined, fixed time of day, said keyboard including means for selecting an alarm mode, said clock means including means for comparing said first and second digital signals and means for providing an indication of coincidence between said first and second digital signals in response to the selection of said alarm mode.

34. The apparatus of claim 33 wherein said storage register means includes an interval storage register for storing a third digital signal representing elapsed time relative to a predetermined reference time, said keyboard including means for selecting an interval mode, said clock means including means for incrementing said third digital signal at predetermined time intervals in response to the selection of said interval mode.

35. The apparatus of claim 31 including a manually portable cabinet for housing said calculator means, said clock means, said clock oscillator means, said keyboard and said display means, whereby said apparatus is manually portable.

36. The apparatus of claim 35 including power supply means housed by said portable cabinet for supplying regulated electrical energy to said calculating means, said clock means, said oscillator means and said display means.

37. Apparatus comprising:

calculator means for digitally performing arithmetic calculations, said calculator means including shift register means for temporarily storing digital data;

clock means for digitally performing time-related clock functions, said clock means including storage register means for storing time-related digital data;

mode selecting means including means for manually selecting a calculating mode and means for manually selecting a clock mode;

means for selectively, manually entering digital input data into said shift register means for storage thereof; and, circuit means responsive to said mode selecting means for selectively supplying said stored digital input data from said shift register means to said storage register means, said stored digital input data being retained in said shift register means for use in performing said arithmetic calculations in response to the selection of said calculating mode and being shifted into said storage register means to provide a time reference from which to perform time-related clock functions in response to the selection of said clock mode.

38. The apparatus of claim 37 including:

display means for visually displaying numerical information; and, means for selectively supplying data from one of said calculator means and said clock means for visual display as numerical information in response to the selection of a corresponding one of said modes.

39. The apparatus of claim 38 including oscillator means for generating a timing signal, said oscillator means, said calculator means and said clock means being formed on at least one integrated circuit chip, said calculator and clock means being synchronously clocked in response to said timing signal.

40. The apparatus of claim 39 wherein said storage register means includes a time of day storage register for storing a first digital signal representing an updated time of day and an alarm storage register for storing a second digital signal representing a predetermined, fixed time of day, said mode selecting means including means for selecting an alarm mode, said clock means including means for comparing said first and second digital signals and means for providing an indication of coincidence between said first and second digital signals in response to the selection of said alarm mode.

41. The apparatus of claim 40 wherein said storage register means includes an interval storage register for storing a third digital signal representing elapsed time relative to a predetermined reference time, said mode selecting means including means for selecting an interval mode, said clock means including means for incrementing said third digital signal at predetermined time intervals in response to the selection of said interval mode.

42. The apparatus of claim 39 including a manually portable cabinet for housing said calculator means, said clock means, said oscillator means, said mode selecting means, said digital data entering means and said display means, whereby said apparatus is manually portable.

43. The apparatus of claim 42 including power supply means housed by said portable cabinet for supplying regulated electrical energy to said calculating means, said clock means, said oscillator means and said display means.

44. The apparatus of claim 43 wherein said clock means and said calculator means are formed on no more than two large scale integrated insulated gate field effect transister circuit chips.

45. The apparatus of claim 38 wherein said storage register means includes an interval storage register for storing a digital signal representing elapsed time relative to a predetermined reference time, said mode selecting means including means for selecting an interval mode, said data entering means including means for entering said reference time into said interval storage register, said clock means including means for incrementing or decrementing said digital signal representing elapsed time at predetermined time intervals in response to the selection of said interval mode, said digital signal being incremented in response to the entering of a zero reference time into said interval storage register and being decremented in response to the entering of a greater than zero reference time into said interval storage register.

46. The apparatus of claim 38 wherein said storage register means includes a calendar storage register for storing a digital signal representing a day and a month, said day and month being selectively displayed by said display means in response to the selection thereof by said supplying means.

47. A method for selectively providing and displaying clock and calculating functions comprising the steps of:

providing circuit means including digital arithmetic calculating circuitry and digital clock circuitry each including at least one storage register and each being operatively connected to a digital display and to a manual input device, said input device including manually positionable mode select means for selecting between a plurality of modes of operation of said circuit means, and manually positionable numerical data entering means, said calculating circuitry being operable to perform arithmetic calculations with numerical data stored in said at least one storage register included in said calculating circuitry and to provide an ouptut signal representative of the results of the arithmetic calculations in a calculating mode of operation of said circuit means, and said clock circuitry being operable to perform time-related clock functions with reference to numerical data stored in said at least one storage register included in said clock circuitry and to provide an output signal representative of the results of the time-related clock functions in a clock mode of operation of said circuit means;

continuously accumulating increments of time to provide an output signal representing time of day in said at least one register of said clock circuitry;

selecting one of a clock mode and a calculating mode of operation of said circuit means by manually positioning said mode select means;

entering numerical data into the one of said storage registers of the calculating circuitry and the clock circuitry corresponding to the selected mode by manually positioning said numerical data entering means; and, selectively displaying an output signal from one of said calculating circuitry and said clock circuitry on said digital display in response to the selected mode.

48. An electronic device comprising:

a power supply for converting and regulating electrical energy;

a keyboard including numerical keys for providing timed digital signals representing numerical data, operation keys for providing timed digital signals representing operation commands, and mode keys for selecting between a plurality of modes of operation;

an electronic digital display connected to said power supply for visually displaying numerical data in response to the application thereto of a digital signal, said display including signal selecting means for effecting the visual display of one of a plurality of applied signals in accordance with the mode selected by said mode keys;

a large scale integrated insulated gate field effect calculating device connected to said power supply and to said keyboard to respectively receive said electrical energy and said digital signals therefrom, said calculating device being operable to electronically perform arithmetic calculations, said calculating device including:

a timing oscillator for generating two-phase signals;

a central timing means for generating timing and synchronizing signals in response to said two-phase signals;

converter means for converting said timed digital signals from said keyboard into coded digital signals having a binary coded decimal format;

a bounce eliminator means connected to said converter means for removing noise from said timed digital signals received from said keyboard and providing irredundant digital data to said converter means;

arithmetic and control circuit means connected to said converter means for arithmetically processing said coded digital signals in accordance with arithmetic operations commanded by said operation keys in response to the selection of a calculating mode of operation by said mode keys, said arithmetic and control circuit means including means for storing said coded digital signals and calculator output signals representing the results of the commanded arithmetic operations; and, output processing means connected to said arithmetic and control circuit means, to said central timing means and to said digital display for supplying said calculator output signals to said selecting means of said digital display in a time-phased manner; a large scale integrated insulated gate field effect clock device connected to said power supply and to said calculating device to respectively receive said electrical energy and said coded digital signals therefrom, said clock device being operable to electronically perform timerelated clock functions, said clock device including:

a central timing means for receiving said calculator timing signals from said calculating device central timing means and for deriving clock timing signals therefrom;

a plurality of registers including a time of day register and an alarm register for receiving and storing said stored coded digital signals from said calculating device arithmetic and control circuit means;

switch input logic means for receiving at least some of said signals provided by said keyboard, for inhibiting the operation of said calculating device output processing means and controlling the storage of said coded digital signals by said registers in response to said at least some of said signals received from said keyboard;

countdown means for producing a single pulse each second;

incrementer means connected to said countdown means and to said registers for incrementing the coded digital signal stored by at least one of said plurality of registers with said single pulse in response to said at least some of said signals received from said keyboard;

output processing means connected to said plurality of registers, to said digital display and to said clock device central timing means for supplying said coded digital signals stored by said plurality of registers to said selecting means of said digital display in a time-phased manner;

alarm logic means connected to said time of day and alarm registers for producing an alarm signal in response to coincidence between the digital signals stored by said time of day and alarm registers; and, mechanical output processing means connected to a predetermined one of said registers for producing a mechanical drum calendar drive signal in response to the digital signal stored by said one of said registers;

a shaping circuit connected to said power supply and to said countdown means for receiving a time dependent AC signal from said power supply and for providing a conditioned periodic signal of at least 50 Hertz to said countdown means;

a drum calendar connected to said mechanical output processing means for providing an indication of a month and a day in response to said mechanical drum calendar drive signal;

alarm means connected to said alarm logic means for producing an audible alarm indication in response to said alarm signal; and, timed switch means connected to said alarm logic means for providing electrical output power to an external device in response to said alarm signal.

* * * * *

UNITED STATES PATENT OFFICE
CERTIFICATE OF CORRECTION

Patent No. 3,813,533 Dated May 28, 1974

Inventor(s) George W. Cone and James E. Kinzie

It is certified that error appears in the above-identified patent and that said Letters Patent are hereby corrected as shown below:

Claim 12, line 1, change "to" to --a--

Claim 26, line 6, delete "a"

Signed and sealed this 1st day of October 1974.

(SEAL)
Attest:

McCOY M. GIBSON JR.
Attesting Officer

C. MARSHALL DANN
Commissioner of Patents

ORM PO-1050 (10-69)

USCOMM-DC 60376-P69
☆ U.S. GOVERNMENT PRINTING OFFICE : 1969 O—366-334.